Oct. 19, 1971  D. H. HOPFE ET AL  3,613,456

BUBBLER METHOD AND APPARATUS

Filed July 25, 1969

INVENTOR
WILLIAM P. WILSON, SR.
DIETER H. HOPFE

*Roderick W. McDonald*
ATTORNEY

United States Patent Office 3,613,456
Patented Oct. 19, 1971

3,613,456
BUBBLER METHOD AND APPARATUS
Dieter H. Hopfe and William P. Wilson, Sr., Houston, Tex., assignors to Dresser Industries, Inc., Dallas, Tex.
Filed July 25, 1969, Ser. No. 844,781
Int. Cl. G01f 23/14; G01n 9/28
U.S. Cl. 73—439
2 Claims

ABSTRACT OF THE DISCLOSURE

Differential bubbler method and apparatus for determining the specific gravity or density of a liquid using a humidified operating gas to prevent deposition of solids in the bubbler pipes.

BACKGROUND OF THE INVENTION

Differential bubbler apparatus is known for the determination of specific gravity or density of a liquid. This apparatus comprises at least one pair of bubbler pipes, an end of each pipe extending downwardly into the sample liquid to be tested so that one end of the pipe is lower in the liquid than the corresponding end of the other pipe. The pressure required to bubble a gas such as air into the sample liquid is equal to the pressure of the liquid at the end of the bubbler pipe. Since the outlet of one pipe is lower than the outlet of the other pipe, the difference in pressure will be the same as the weight of a constant-height column of the liquid. The differential-pressure measurement is equivalent to the weight of a contant volume of the liquid and is oftentimes represented directly as density. Conventional differential bubbler apparatus is fully and completely disclosed in "Process Instruments and Controls Handbook" by D. M. Considine, McGraw-Hill Company, Inc., New York, 1957, pages 7–58, the disclosure of which is incorporated herein by reference.

A omnipresent problem with bubbler apparatus has been plugging of the bubble pipes when immersed in aqueous liquids which precipitate solids upon exposure to gas, usually air, which is such as that used in the bubbler apparatus. This problem is recognized in the prior art, e.g., the "Process Instruments and Controls Handbook" above cited, pages 7–58 and the "Chemical Engineer's Handbook" by Perry, 4th edition, McGraw-Hill Book Company, New York, 1963, pages 22–37.

SUMMARY OF THE INVENTION

It has now been discovered that if the gas used in the bubbler pipes is sufficiently humidified before bubbling through the test liquid, the problem of plugging of the bubbler pipes when operated in aqueous liquids which deposit solids is substantially eliminated.

This invention also relates to bubbler apparatus having humidifying means operably connected thereto to humidify the operating gas thereof.

This invention is also applicable to liquid level measuring apparatus that employs only one bubbler pipe. By this invention differential bubbler apparatus is rendered operable with liquids which were heretofore taught by the prior art not to be useful therewith. This invention, therefore, greatly expands the scope of liquids with which differential bubbler apparatus can be employed for the determination of the specific gravity and/or density thereof.

Accordingly it is an object of this invention to provide a bubbler method for preventing plugging of the bubbler pipes thereof.

It is another object to provide a differential bubbler apparatus which is substantially nonplugging in operation.

Other aspects, objects and advantages of this invention will be apparent to those skilled in the art from the disclosure and the appended claims.

DETAILED DESCRIPTION OF THE INVENTION

Figure 1:
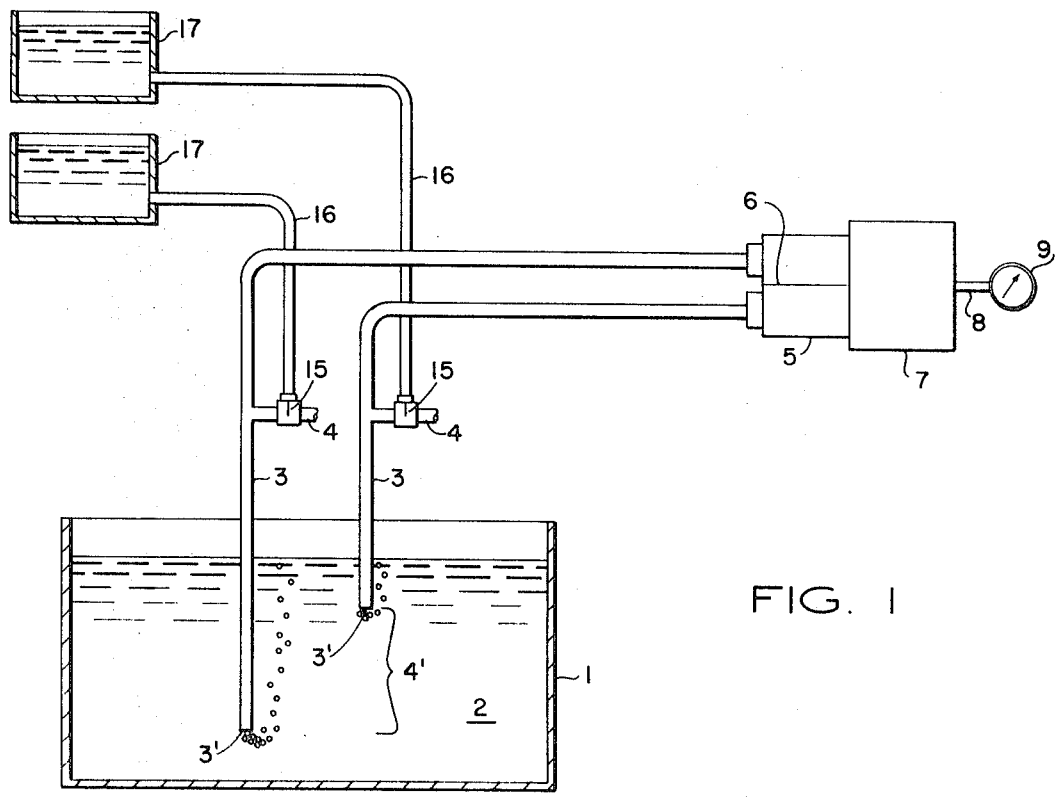
FIG. 1 shows differential bubbler apparatus employing this invention.

FIG. 1 shows vessel 1 contains sample liquid 2 therein. The differential bubbler apparatus comprises a pair of bubbler pipes 3, 3 which are immersed into liquid 2 different distances thereby providing the constant-height column of liquid 4' mentioned hereinabove.

A purge gas such as air is introduced into each bubbler pipe 3 by way of pipes 4, 4 and each bubble pipe 3 is openly connected with the interior of diaphragm housing 5. Each bubbler pipe is connected to housing 5 on opposite sides of diaphragm 6. Normally, a diaphragm capsule is an integral portion of a conventional differential pressure cell. A pressure transmitter is also normally a portion of a conventional differential pressure cell. Diaphragm 6 is operatively connected to a conventional differential pressure transmitter 7 which in turn is operatively connected by way of pipe 8 to a conventional read-out device such as gauge 9.

The differential pressure-measuring and read-out apparatus 5, 7 and 9 are known in the art and a wide variety of suitable devices are available for use with this invention. For example, the various devices set forth on pages 22–14 through 22–16 of the above cited Perry's "Chemical Engineer's Handbook" are useful in this invention and it is well known by those skilled in the art how to adapt any of these devices to the apparatus shown in FIG. 1.

In operation, purge gas such as air is introduced into bubbler pipes 3, 3 and allowed to bubble out of submerged ends 3', 3', the differential pressure transmitting and read-out devices 5, 7 and 9 sensing and registering the differential pressure caused by constant-height column 4'. The differential pressure can be made to read out directly as, for example, density.

Pipes 4, 4 each contain a hollow needle 15, 15 which is connected by a conduit means such as a hose 16, 16 to a water source or sources 17, 17 so that water can be admitted as drops through an aperture in the needle to the air passing through pipes 4, 4 and into bubbler pipe 3, 3. Conventional valves or other metering means (not shown) can be employed in conduits 16, 16 to regulate the number of drops of water admitted to the interior of pipes 4, 4 over a given period of time.

Generally, any means of introducing water to the interior of pipes 4, 4 and/or bubbler pipes 3, 3 can be employer in the practice of this invention. For example, spray heads or atomizing devices could be employed in the interior of the pipes to inject a fine mist or other spray of water into the interior of the pipes in lieu of the drops injected by needles 15, 15. The ultimate desired result of this apparatus is the humidification of the gas passing through pipes 4, 4 and 3, 3 and any apparatus other than that shown in FIG. 1 which will obtain the desired humidification results can be employed.

The desired humidification for this invention is that which substantially prevents deposition of solids in the bubbler pipe as disclosed hereinafter with reference to FIG. 2. The amount of humidification necessary to achieve these results will vary widely depending upon the gas employed, the composition of the liquid to be tested, and the like, but generally the humidity of the gas should be raised to at least about 20 percent relative humidity. In most cases at least one, preferably at least two, drops of water injected into the gas stream per minute will be sufficient.

Figure 2:
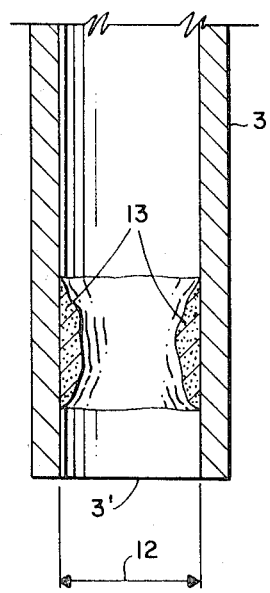
FIG. 2 shows an elevational cross-sectional view of a conventional bubbler pipe.

FIG. 2 shows a bottom portion of one bubbler pipe 3 and its end 3'. Generally, diameter 12 of the pipe varies from about ½ to about 2 inches. In operation with an aqueous liquid which contains suspended and/or dissolved solids and which deposits solids upon exposure to air, such a pipe has been reduced in diameter or plugged, thereby causing inaccurate density measurements, by the deposition of solids 13 on the interior of the pipe anywhere from about ⅛ inch up to about 3 inches into the interior of the pipe.

Example

A sample well drilling fluid is prepared by mixing at ambient conditions of temperature and pressure 0.69 barrel (42 U.S. gallons) of water, 18 pounds per barrel of sodium lignosulfonate, 385 pounds per barrel of barium sulfate, 8 pounds per barrel of chrome lignosulfonate and 2 pounds of sodium hydroxide. This drilling fluid is employed with apparatus substantially as shown in FIG. 1 and is the test fluid 2 of FIG. 1.

When pipes 3, 3 are submerged in the drilling fluid and air is passing through pipes 4, 4 and 3, 3 so as to bubble out through the drilling fluid in the normal operating manner, the air-drilling fluid interface in the interior of pipes 3, 3 is about ¼ inch up into pipes 3, 3 from ends 3', 3'.

When air normally used in the operation of pneumatic instruments, which is the type of gas normally available and used in differential bubbler apparatus, is employed, about a 1/16 inch thick deposit on the inside of pipes 3, 3 of solids from the drilling fluid is obtained in 1 to 3 days of operation, the deposit being substantially the same as that shown by reference numeral 13 in FIG. 2.

When two drops of water per minute are injected through needles 15, 15 into pipes 4, 4 no solid deposition 13 as shown in FIG. 2 is found after a two week period.

Thus, the injection of water into the air before bubbling of the air through the drilling fluid prevented substantial deposition of solids on the interior of pipes 3, 3.

Reasonable variations and modifications are possible within the scope of this disclosure without departing from the spirit and scope of this invention.

The embodiments of the invention in which an exclusive property or privilege is claimed are defined as follows:

1. In a method for operating a differential bubbler in a solids containing aqueous liquid including a water component wherein a gas such as air is bubbled through said liquid using at least one bubbler pipe, the improvement comprising introducing a fine spray of water into said gas to humidify said gas before bubbling same through said liquid, said humidification of said gas being sufficient to prevent substantial deposition of said solids in said bubbler pipe.

2. In a differential bubbler apparatus wherein at least two bubbler pipes are connected to a differential pressure means, said bubbler pipes being adapted to extend into a liquid being tested, the improvement comprising humidifying means operably connected to said bubbler apparatus for spraying liquid into the gas passing through said bubbler pipes thereby humidifying said gas.

References Cited

UNITED STATES PATENTS

| 2,577,548 | 12/1951 | Vetter | 73—439 |
| 3,399,573 | 9/1968 | Ponsar | 73—438 |

FOREIGN PATENTS

| 741,197 | 11/1943 | Germany | 73—439 |

RICHARD C. QUEISSER, Primary Examiner

E. J. KOCH, Assistant Examiner

U.S. Cl. X.R.

73—302